US009392164B2

(12) United States Patent
Im et al.

(10) Patent No.: US 9,392,164 B2
(45) Date of Patent: Jul. 12, 2016

(54) USER TERMINAL FOR A TELEMEDICINE IMAGE SERVICE AND CONTROL METHOD THEREOF

(71) Applicant: SAMSUNG ELECTRONICS CO., LTD., Suwon-si (KR)

(72) Inventors: Sang-kyun Im, Seoul (KR); Cheon-seong Lee, Yongin-si (KR)

(73) Assignee: SAMSUNG ELECTRONICS CO., LTD., Suwon-si ( * ) Notice: Subject to any disclaimer, the term of this patent is extended or adjusted under 35 U.S.C. 154(b) by 0 days.

(21) Appl. No.: 14/582,906

(22) Filed: Dec. 24, 2014

(65) Prior Publication Data

US 2015/0180917 A1 Jun. 25, 2015

(30) Foreign Application Priority Data

Dec. 24, 2013 (KR) ........................ 10-2013-0162271

(51) Int. Cl.
*H04L 29/06* (2006.01)
*H04N 5/232* (2006.01)

(52) U.S. Cl.
CPC ........... *H04N 5/23222* (2013.01); *H04N 5/232* (2013.01)

(58) Field of Classification Search
CPC .......................... H04L 65/403; H04N 5/23222
USPC ................. 348/14.01, 162, 77, 157; 378/198; 382/131, 305; 600/300; 705/2, 3; 707/752; 345/619; 433/24; 606/130; 715/268
See application file for complete search history.

(56) References Cited

U.S. PATENT DOCUMENTS 6,006,191 A * 12/1999 DiRienzo .............. G06F 19/321 705/2
7,283,153 B2 * 10/2007 Provost ................ A61B 5/0022 348/14.01
7,817,836 B2 * 10/2010 Chao ........................ G06K 9/34 382/131
8,021,045 B2 * 9/2011 Foos .................... A61B 6/4405 378/162
8,092,215 B2 * 1/2012 Stone-Collonge .. G06F 19/3437 433/24
8,635,084 B2 * 1/2014 Phillips ............... G06F 19/3418 705/2
8,738,394 B2 * 5/2014 Kuo ...................... G06F 19/322 705/2
8,774,560 B2 * 7/2014 Sugaya ................. G06F 19/321 382/128
9,171,344 B2 * 10/2015 Yu .......................... G06Q 50/24
2002/0065682 A1 * 5/2002 Goldenberg .......... G06F 19/324 705/2
2002/0141630 A1 10/2002 Akahori (Continued)

FOREIGN PATENT DOCUMENTS

JP 2005-10884 A 1/2005

OTHER PUBLICATIONS

Search Report dated Apr. 10, 2015 issued by the International Searching Authority in counterpart International Patent Application No. PCT/KR2014/012493 (PCT/ISA/210).

*Primary Examiner* — Gerald Gauthier
(74) *Attorney, Agent, or Firm* — Sughrue Mion, PLLC

(57) ABSTRACT

A user terminal for conducting a telemedicine service with a medical team is provided. The user terminal connects with a second user terminal of the medical team, and acquires a patient image captured by photographing a patient. A controller transmits the acquired patient image to the second user terminal, and receives image control information for changing the transmitted patient image from the second user terminal. The user terminal changes properties of the photographed patient image based on the received image control information, and transmits the patient image changed in properties to the second user terminal.

20 Claims, 7 Drawing Sheets

START
S110 CONNECT WITH SECOND USER TERMINAL FOR MEDICAL TEAM
S120 TRANSMIT PATIENT IMAGE CAPTURED BY PHOTOGRAPHING PATIENT TO SECOND USER TERMINAL
S130 RECEIVE IMAGE CONTROL INFORMATION FOR CHANGING PATIENT IMAGE FROM SECOND USER TERMINAL
S140 CHANGE PROPERTIES OF PATIENT IMAGE TO BE PHOTOGRAPHED, BASED ON RECEIVED IMAGE CONTROL INFORMATION
S150 TRANSMIT PATIENT IMAGE CHANGED IN PROPERTIES TO SECOND USER TERMINAL
END

(56) References Cited

U.S. PATENT DOCUMENTS

2003/0179292 A1 9/2003 Provost et al.
2008/0114375 A1* 5/2008 von Jako ............ A61B 19/5244 606/130
2011/0144451 A1* 6/2011 Robertson .............. A61B 5/684 600/300
2011/0166465 A1 7/2011 Clements et al.
2011/0178373 A1 7/2011 Pacey et al.
2011/0191356 A1* 8/2011 Gazula .................... G06F 17/30 707/752
2011/0288888 A1* 11/2011 Gazula ................... G06Q 10/10 705/3
2013/0038738 A1* 2/2013 Ando ................... A61B 6/4266 348/162
2013/0073312 A1* 3/2013 Thompson .......... G06F 19/3462 705/2
2013/0162844 A1 6/2013 Douek
2014/0019855 A1* 1/2014 Kim ....................... G06Q 10/10 715/268
2014/0122101 A1* 5/2014 Fukumaru ............. G06F 19/322 705/2
2015/0035856 A1* 2/2015 Im ........................... G06T 11/60 345/619
2015/0174448 A1* 6/2015 Im ........................... H04L 67/12 348/157
2015/0178912 A1* 6/2015 Im ........................... G06T 7/004 348/77
2015/0180917 A1* 6/2015 Im ...................... H04N 5/23222 348/14.01

* cited by examiner 10
100
300
200
200
(1) ACQUIRE PATIENT IMAGE
(4) CHANGE PROPERTIES OF PATIENT IMAGE
(5) ACQUIRE PATIENT IMAGE CHANGED IN PROPERTIES
(2) TRANSMIT PATIENT IMAGE
(3) RECEIVE IMAGE CONTROL INFORMATION
(6) TRANSMIT PATIENT IMAGE CHANGED IN PROPERTIES
BY PATIENT, POSITIONING CAMERA TO DIAGNOSIS AREA
BY MEDICAL TEAM, REMOTELY CONTROLLING CAMERA

USER TERMINAL FOR A TELEMEDICINE IMAGE SERVICE AND CONTROL METHOD THEREOF

CROSS-REFERENCE TO RELATED APPLICATION

This application claims priority from Korean Patient Application No. 10-2013-0162271, filed on Dec. 24, 2013 in the Korean Intellectual Properties Office, the disclosure of which is incorporated herein by reference.

BACKGROUND

1. Field

Apparatuses and methods consistent with the exemplary embodiments relate to a user terminal and a control method thereof, and more particularly to a user terminal and a control method thereof, which enables a patient and a medical team to use a telemedicine service.

2. Description of the Related Art

A telemedicine service refers to a medical care service that uses a telephone, the Internet, and a wireless communication device for communication between a patient and a medical team without the patient and the medical team meeting face-to-face with each other. The telemedicine services extensively range from the scheduling of a wired/wireless appointment with a doctor, to the offering of a patient's medical information and examination information from a medical team of a tertiary medical center to a medical team of a secondary medical center, i.e., a small or medium hospital, and to the quick administration of first aid to a patient in an emergency based on the consultation of a medical team.

With the development of technologies for video calls and video chatting, a telemedicine video service has also been developed to enable a patient to be face-to-face with, and get medical treatment from, a medical team.

However, while providing the telemedicine video service, a medical team may depend on a conversation with a patient to determine a patient's condition since an image for observing a patient's physical condition is hardly given in high definition. Further, in the telemedicine video service, there is a limit to how closely a medical team can observe a diagnosis area of a patient's body to determine a patient's condition.

SUMMARY

An aspect of an exemplary embodiment provides a user terminal and a control method thereof, in which the properties of a patient image for a telemedicine video service to be captured by photographing a patient is changed based on image control information received from a terminal of a medical team, thereby providing accuracy and convenience of medical treatment.

In accordance with an exemplary embodiment, there is provided a user terminal comprising: a communicator configured to connect with a second user terminal of a medical team; an image acquirer configured to acquire a patient image captured by photographing a patient; and a controller configured to transmit the acquired patient image to the second user terminal, receive image control information for changing the transmitted patient image from the second user terminal, change properties of the photographed patient image based on the received image control information, and control the communicator to transmit the patient image changed in properties to the second user terminal. Thus, for a telemedicine video service, a terminal of a medical team can directly change the properties of a patient image captured by a patient, and therefore observe a diagnosis area of the patient closely in order to administer medical treatment.

The properties of the patient image may comprise at least one of a magnification, a resolution, a white balance, an exposure, a flash mode and a photographing mode. Thus, the terminal of the medical team can change the properties of the patient image as desired so as to closely observe the patient image.

The image acquirer may comprise a camera configured to capture the patient image. Also, the image acquirer may receive the patient image from an external electronic device. Thus, a smart phone or the like mounted with a camera can be used to obtain a patient image captured by accurately photographing a wounded area or a diagnosis area at various positions and angles.

The user terminal may comprise a display configured to display an image, and the controller may control the display to display the patient image. Thus, for a telemedicine video service, a patient can directly view an image captured by photographing the diagnosis area through a screen of the user terminal.

The communicator may connect with the second user terminal via a server. The communicator may also connect with the second user terminal via a display apparatus. Thus, a patient can directly transmit a captured patient image to a terminal of a medical team or via a server for integrated management of patient image data.

In accordance with an exemplary embodiment, there is provided a method comprising: connecting with a second user terminal of a medical team; transmitting a patient image captured by photographing a patient to the second user terminal; receiving image control information for changing the transmitted patient image from the second user terminal; changing properties of the photographed patient image based on the received image control information; and transmitting the patient image changed in properties to the second user terminal.

The properties of the patient image may comprise at least one of a magnification, a resolution, a white balance, an exposure, a flash mode and a photographing mode.

The patient image may comprise an image captured by a camera. Also, the patient image may comprise an image received from an electronic device.

The method may further comprise displaying the patient image on a display.

The connecting with the second user terminal may comprise connecting with the second user terminal via a server. The connecting with the second user terminal may also comprise connecting with the second user terminal via a display apparatus.

In accordance with an exemplary embodiment, there is provided a method of controlling a user terminal of a telemedicine service, the method comprising: connecting the user terminal with a second user terminal of a medical team; capturing a first image of a diagnostic area of a patient with a camera; transmitting the captured first image of the diagnostic area of the patient to the second user terminal; receiving image control information for changing properties of the captured first image from the second user terminal; capturing a second image of the diagnostic area of the patient based on the received image control information, and transmitting the second image to the second user terminal.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION OF EXEMPLARY EMBODIMENTS

Hereinafter, exemplary embodiments will be described in detail with reference to accompanying drawings so as to be easily realized by a person having an ordinary skill in the art, but not limited to the following exemplary embodiments set forth herein. Descriptions about unrelated parts are omitted for clarity, and like numbers refer to like elements throughout.

Figure 1:
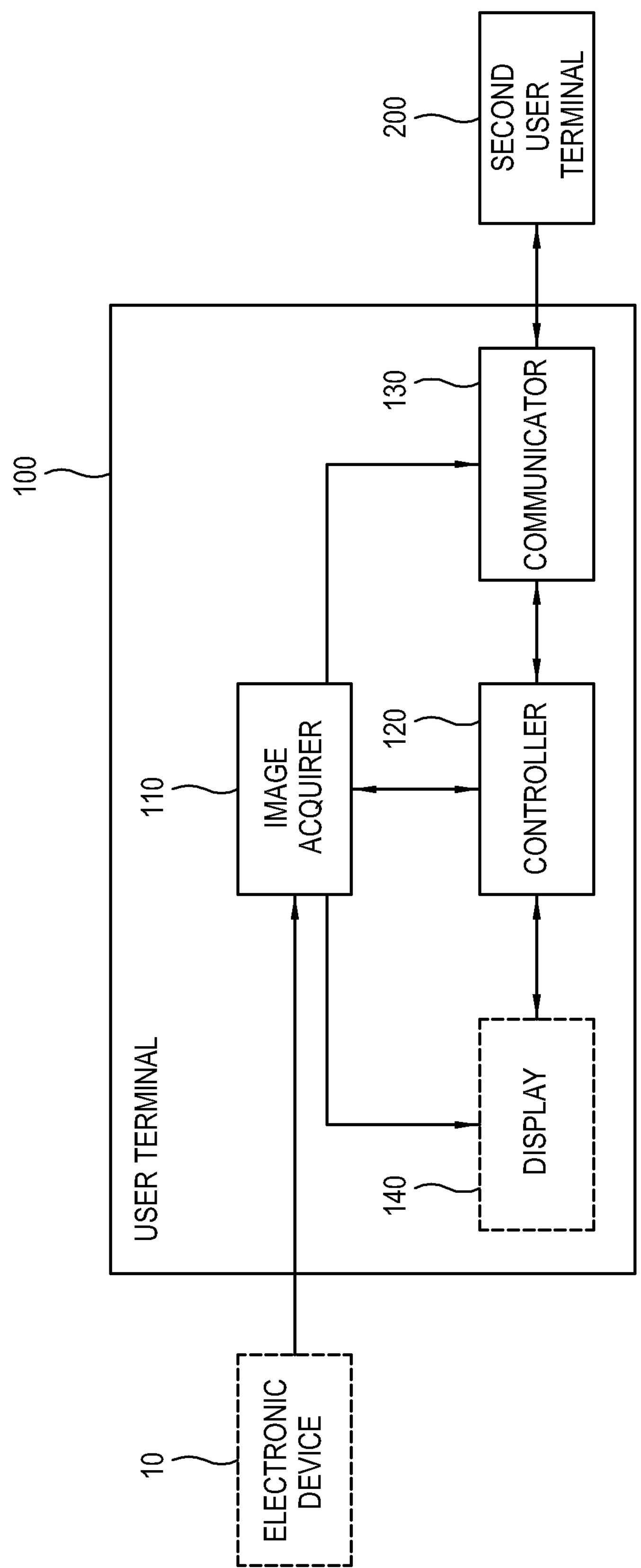
FIG. 1 is a block diagram of a user terminal according to an exemplary embodiment.

Hereinafter, elements of a user terminal according to exemplary embodiments will be first described in detail with reference to FIG. 1 and with regard to FIGS. 5 and 6 as necessary. FIG. 1 is a block diagram of a user terminal according to an exemplary embodiment. As shown in FIG. 1, a user terminal 100 includes an image acquirer 110, a controller 120, and a communicator 130, and connects with a second user terminal 200. According to an exemplary embodiment, the user terminal 100 may connect with an electronic device 10. For example, the user terminal 100 may be achieved by a television (TV), a smart phone, a tablet computer, a personal computer (PC), a notebook computer, etc., and the second user terminal 200 may be achieved by a TV, a tablet computer, a PC, a note book computer, etc. In addition, the electronic device 10 may be achieved by a smart phone, a remote controller, or the like that includes a camera. To provide the telemedicine image service, the user terminal 100 may connect with the second user terminal 200 of the medical team, and transmit an initial patient image captured by photographing a patient to the second user terminal 200. The user terminal 100 receives image control information for changing the initial patient image from the second user terminal 200, and changes the properties of a subsequent patient image to be photographed, based on the received image control information. The user terminal 100 transmits the patient image changed in properties to the second user terminal 200. Thus, the user terminal 100 according to an exemplary embodiment receives the image control information about the patient image from the second user terminal 200 of the medical team, and changes the properties of a subsequent patient image to be photographed, thereby allowing the medical team to provide the medical treatment to the patient based on a higher definition image of the patient image.

The communicator 130 connects with the second user terminal 200 of the medical team. The user terminal 100 may be connected to the second user terminal 200 of the medical team via the external Internet, and the second user terminal 200 may be provided as a smart TV, a PC, a note book computer or the like that can be connected to the Internet.

The image acquirer 110 acquires an initial patient image captured by directly photographing a patient. The patient image may be a still image or a moving image with regard to a wounded or diagnosis area of a patient, desired to be observed by a medical team. As shown in FIG. 5, the image acquirer 110 may receive a patient image from an external electronic device 10. In this case, the external electronic device 10 may be achieved by a smart phone, a remote controller or the like to which a camera device is mounted. Alternatively, as shown in FIG. 6, the image acquirer 110 may include a camera for photographing a patient image. In this case, the user terminal 100 may be achieved by a smart phone or the like.

The controller 120 transmits a patient image acquired by the image acquirer 110 to the second user terminal 200, and receives the image control information for changing the transmitted patient image from the second user terminal 200. The controller 120 changes the properties of the transmitted patient image or the patient image to be photographed, based on the received image control information. The properties of the patient image may include at least one of a magnification, a resolution, a white balance, an exposure, a flash mode and a photographing mode.

For example, in a telemedicine image service, a patient receives an instruction through a video conversation with a medical team on a monitor of the user terminal 100, and positions the camera at a wounded area or a diagnosis area through the smart phone or the like mounted with the camera in accordance with the instructions of a doctor. When the patient photographs the diagnosis area through the camera of the smart phone, the photographed image is transmitted to the user terminal 100 and then transmitted to the second user terminal 200. A medical team receives a patient image desired to be observed from the user terminal 100 of the patient. Accordingly, the medical team may remotely control image properties such as the magnification, the resolution, the white balance, the exposure, the flash mode, the photographing mode, etc. of the patient image to be photographed, so that the received patient image can be optimized for diagnosis. At this time, the properties of a patient image to be photographed may include all the functions of the camera adjustable to optimize the patient image for diagnosis of a medical team, but is not limited thereto. Thus, the controller 120 controls the communicator 130 to transmit a patient image changed in properties to the second user terminal 200.

Figure 5:
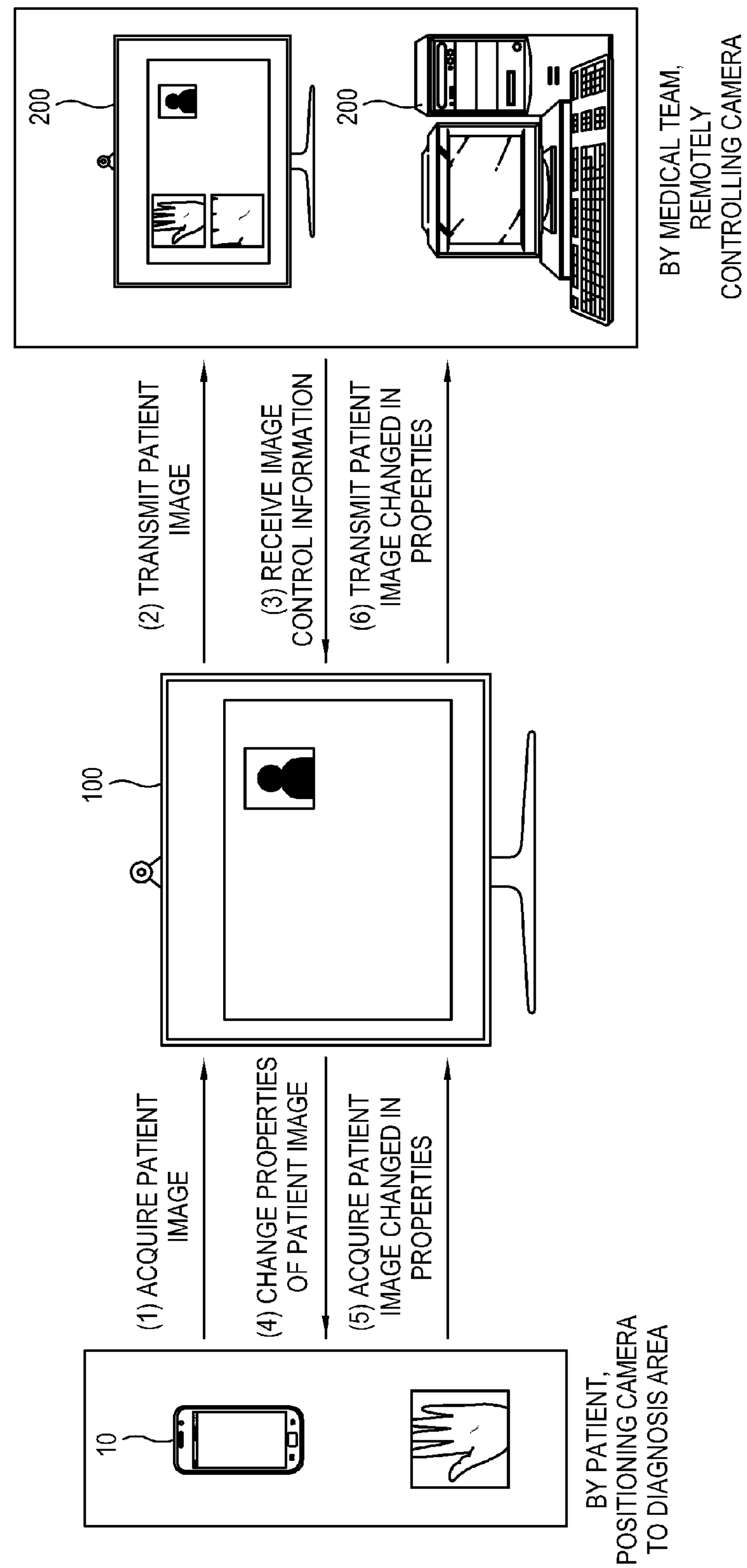
FIG. 5 shows an example of changing properties of a patient image in a user terminal according to an exemplary embodiment.

As shown in FIG. 5, if the user terminal 100 is a TV and an initial patient image is captured by the smart phone or similar electronic device 10, the controller 120 of the user terminal 100 of the patient transmits the initial patient image from the smart phone to the second user terminal 200 and receives the image control information for the initial patient image from the second user terminal 200, so that the properties of a subsequent patient image of the diagnostic area to be photographed by the smart phone can be changed based on the received image control information. The controller 120 may perform control so that an image changed in properties in accordance with the received image control information can be captured by the smart phone, and the patient image changed in properties can be acquired from the smart phone by the user terminal 100 of the patient and the acquired patient image can be transmitted to the second user terminal 200.

Figure 6:
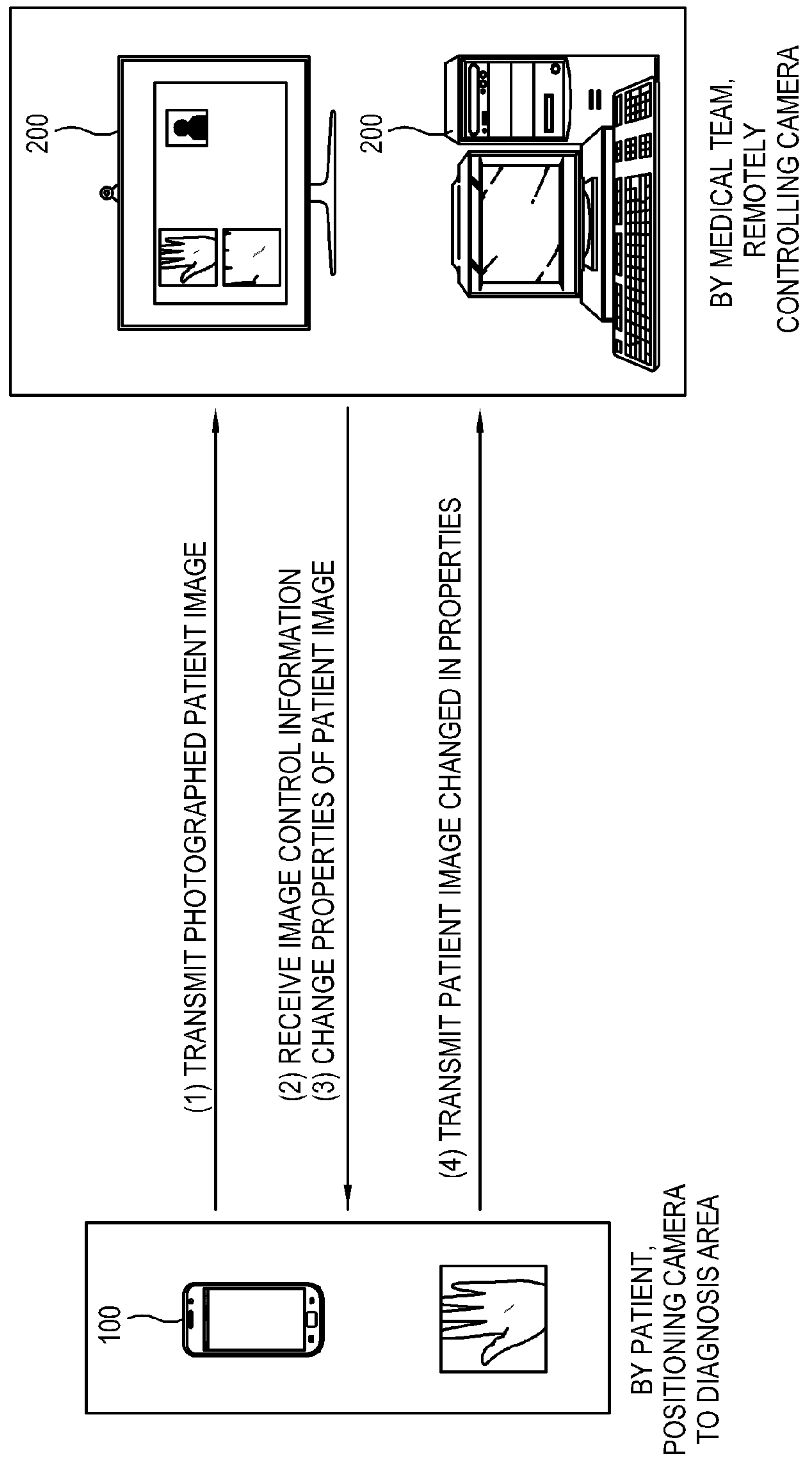
FIG. 6 shows an example of changing properties of a patient image in a user terminal according to another exemplary embodiment.

Alternatively, as shown in FIG. 6, if the user terminal 100 is a smart phone, the controller 120 transmits an initial patient image photographed by the smart phone to the second user terminal 200, and receives the image control information about the initial photographed patient image from the second user terminal 200 so that the properties of a subsequent patient image of the diagnostic area photographed by the smart phone can be changed based on the received image control information. At this time, the controller 120 may perform control so that the patient image changed in properties can be transmitted to the second user terminal 200.

The user terminal 100 may further include a display 140 for displaying an image, and the controller 120 may control the display 140 to display the patient image. For example, as shown in FIG. 5, if the user terminal 100 is a TV, the controller 120 performs control so that a patient image corresponding to a diagnosis area photographed by the smart phone can be viewed on a screen of the TV, and the patient image changed in properties controlled by the second user terminal 200 of a medical team can be viewed on the screen of the TV. Alternatively, if the user terminal 100 is the smart phone as shown in FIG. 6, the controller 120 may allow both the directly photographed patient image and the patient image changed in properties controlled by the second user terminal 200 to be viewed on a screen of the smart phone.

Figure 2:
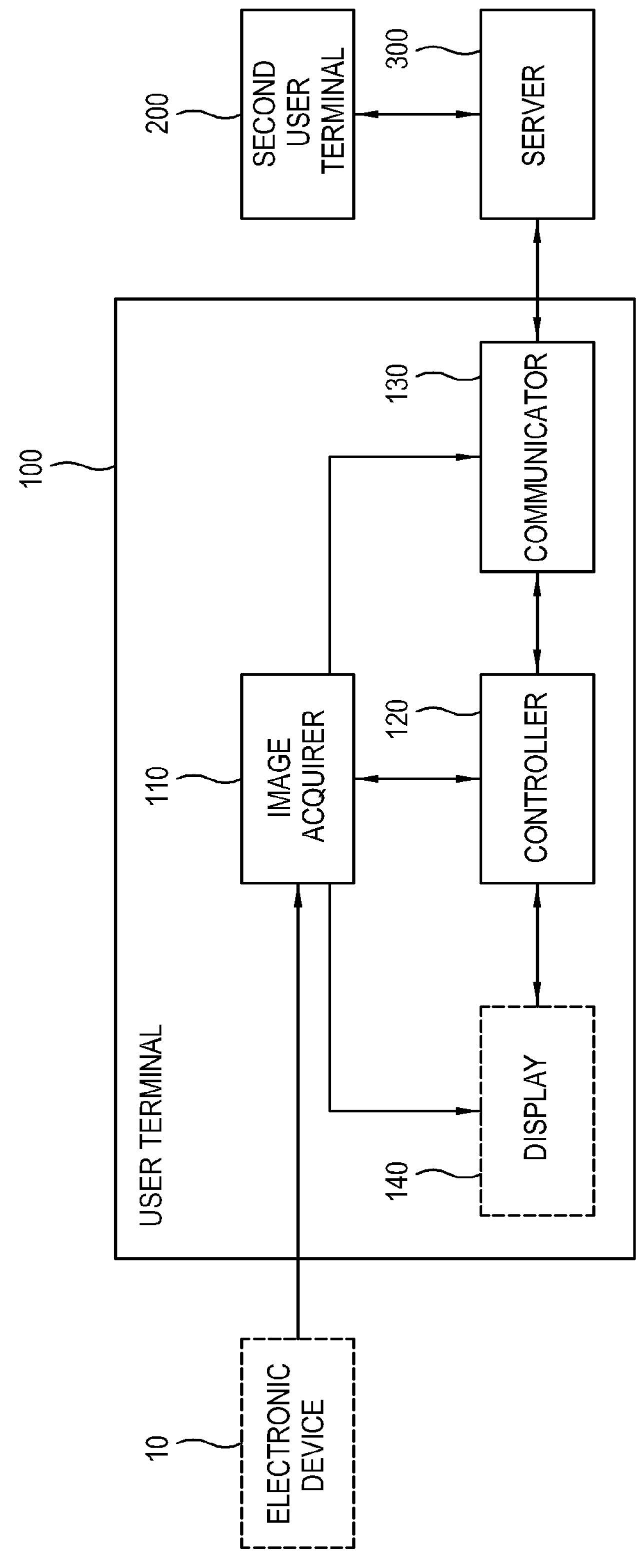
FIG. 2 is a block diagram of a user terminal according to another exemplary embodiment.

FIG. 2 is a block diagram of a user terminal according to an exemplary embodiment. As shown in FIG. 2, the user terminal 100 includes the image acquirer 110, the controller 120 and the communicator 130, and further includes the display 140 according to this exemplary embodiment. The user terminal 100 connects with a server 300, and the server 300 connects with the second user terminal 200. That is, the communicator 130 of the user terminal 100 connects with the second user terminal 200 via the server 300. Alternatively, the user terminal 100 may connect with the electronic device 10. The user terminal 100 may for example, be achieved by a TV, a smart phone, a tablet computer, a PC, a notebook computer, etc. and the server 300 may be achieved by a computer which processes a high amount of data. The second user terminal 200 may be achieved by a TV, a smart phone, a tablet computer, a PC, a notebook computer, etc., and the electronic device 10 may be achieved by a smart phone, a remote controller or the like to which a camera is mounted.

Figure 7:
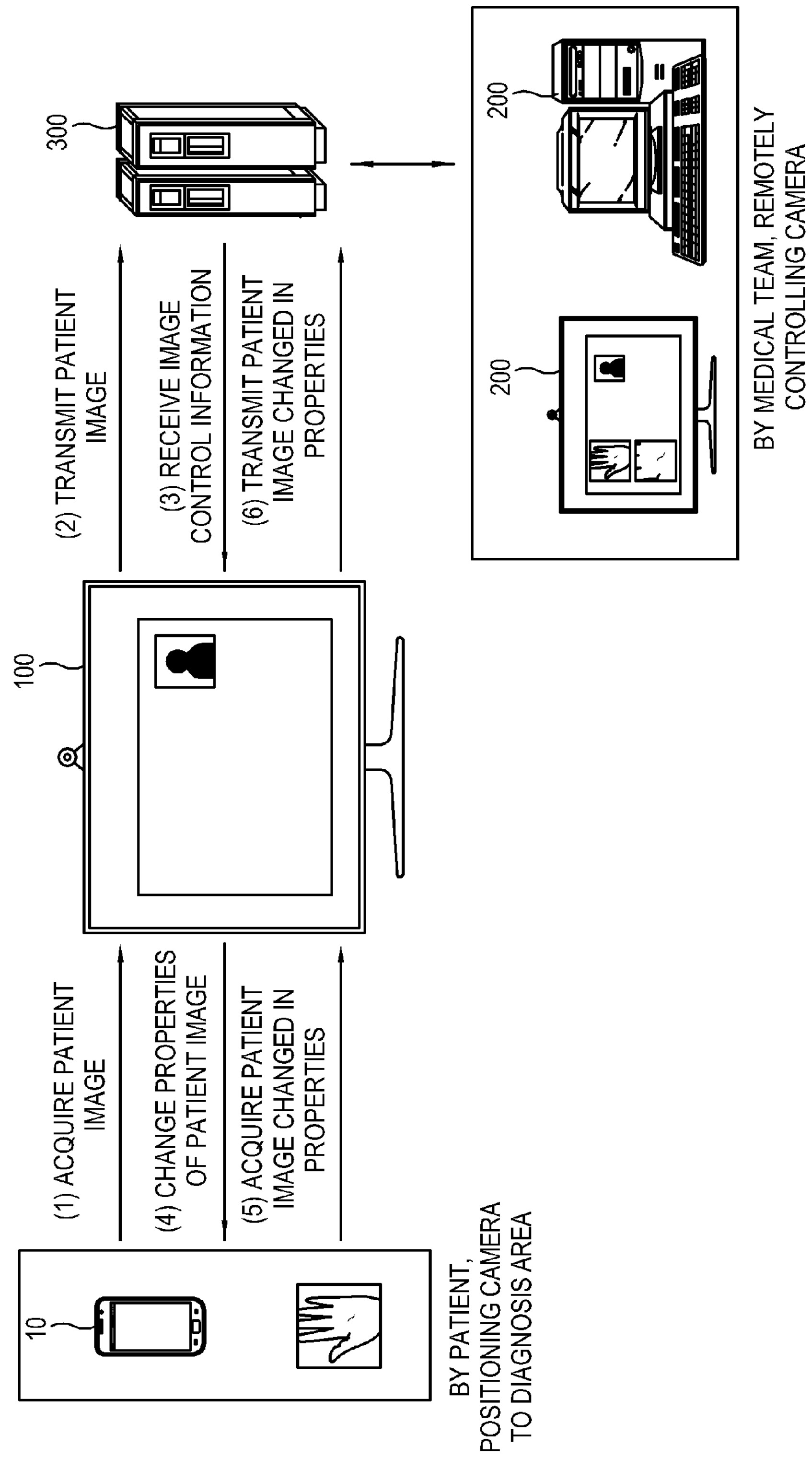
FIG. 7 shows an example of changing properties of a patient image in a user terminal according to another exemplary embodiment.

Contrary to FIG. 1 which illustrates that the user terminal 100 of a patient is directly connected to the second user terminal 200 of a medical team, FIG. 2 shows that the user terminal 100 of a patient is configured to exchange information with the second user terminal 200 of a medical team via the server 300 which offers a medical service. As shown in FIG. 7, if the user terminal 100 is a TV and the electronic device 10 is a smart phone, a patient receives an instruction through a video conversation with a medical team on a screen of the TV, and positions the camera at a wounded area or similar diagnosis area through the smart phone or a similar device mounted with the camera in accordance with the instructions of a doctor. When a patient initially photographs the diagnosis area through the camera of the smart phone, the photographed image is transmitted to the user terminal 100. The user terminal 100 transmits the initially photographed patient image to the server 300 which provides a medical service, and then the server 300 transmits the initial patient image to the second user terminal 200 of the medical team. The medical team transmits the image control information for controlling at least one of the magnification, the resolution, the white balance, the exposure, the flash mode, the photographing mode, etc. of the patient image to the server 300 so that a subsequent patient image of the diagnostic area received from the server 300 can be optimized for diagnosis. Then, the server 300 transmits the received image control information to the user terminal 100 of the patient. The user terminal 100 changes the properties of the initial patient image photographed by the electronic device 10 or a subsequent image photographed by the electronic device 10, i.e. the smart phone, based on the image control information, and then transmits the patient image changed in properties to the second user terminal 200 of the medical team via the server 300.

Figure 3:
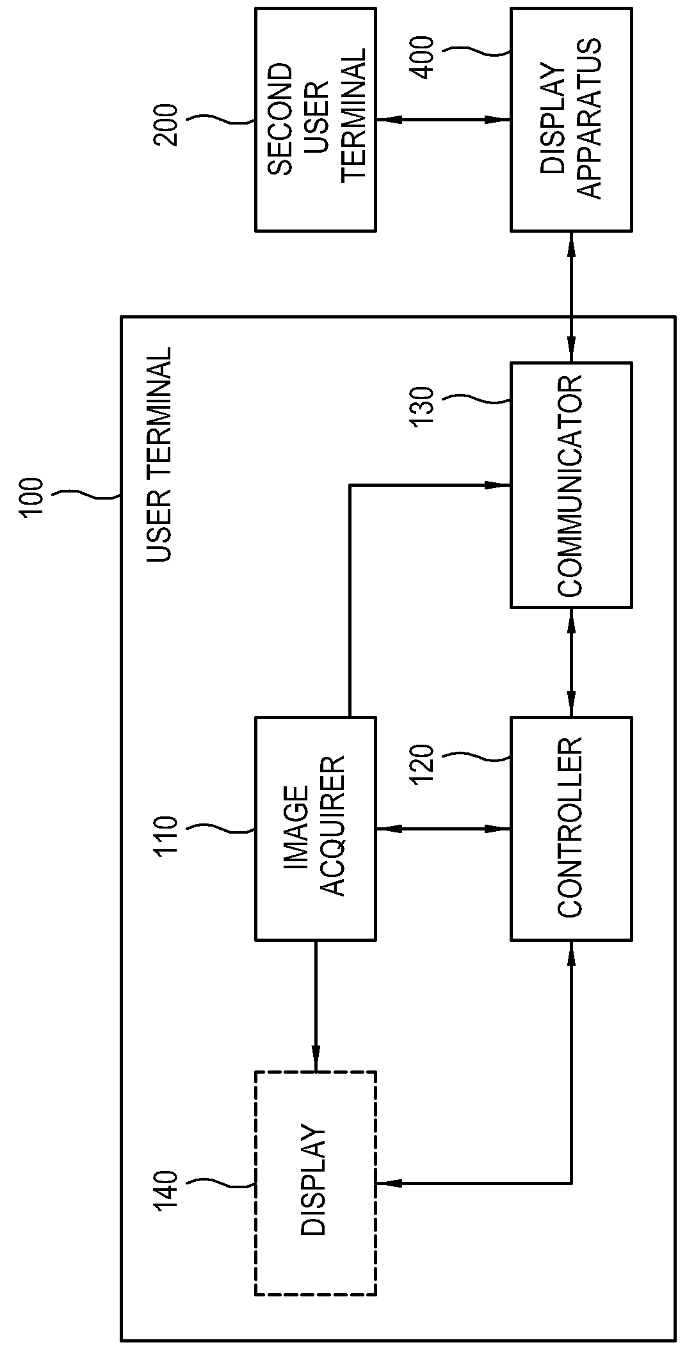
FIG. 3 is a flowchart of a user terminal according to an exemplary embodiment.

FIG. 3 is a flowchart of a user terminal according to an exemplary embodiment. As shown in FIG. 3, the user terminal 100 includes the image acquirer 110, the controller 120 and the communicator 130, and further includes the display 140 according to this exemplary embodiment. The user terminal 100 connects with a display apparatus 400, and the display apparatus 400 connects with the second user terminal 200. That is, the communicator 130 of the user terminal 100 connects with the second user terminal 200 via the display apparatus 400. The user terminal 100 and the display apparatus 400 may for example be achieved by a TV, a smart phone, a tablet computer, a PC, a notebook computer, etc. and the second user terminal 200 may be achieved by a TV, a tablet computer, a PC, a notebook computer, etc.

Contrary to FIG. 1 which illustrates that the user terminal 100 of a patient is directly connected to the second user terminal 200 of a medical team, and FIG. 2 which illustrates that the user terminal 100 for a patient is connected to the second user terminal 200 of the medical team via the server 300 offering a medical service, FIG. 3 illustrates that the user terminal 100 of a patient is configured to exchange information with the second user terminal 200 of a medical team via the display apparatus 400 of the patient or a third party.

For example, if the user terminal 100 of a patient is a smart phone and the display apparatus 400 is a TV or PC connecting with the user terminal 100, a patient gets an instruction through a video conversation with a medical team on a screen of the TV or PC, and positions the camera at a wounded area or similar diagnosis area though the smart phone or the like mounted with the camera in accordance with the instructions of a doctor. When a patient initially photographs the diagnosis area through the camera of the smart phone, the initially photographed image is transmitted to the display apparatus 400. The display apparatus 400 transmits the patient image to the second user terminal 200 of the medical team, and the medical team transmits the image control information for controlling the magnification, the resolution, the white balance, the exposure, the flash mode, the photographing mode, etc. of the patient image to the display apparatus 400 so that a subsequent patient image of the diagnostic area received from the display apparatus 400 can be optimized for diagnosis. Then, the display apparatus 400 transmits the received image control information to the user terminal 100 of the patient, i.e. the smart phone. The smart phone changes the properties of a subsequent patient image of the diagnostic area to be photographed, based on the received image control information, and then transmits the patient image changed in properties to the second user terminal 200 of the medical team via the display apparatus 400. Thus, a higher definition patient image is used in a telemedicine image service between a patient and a medical team, and therefore medical treatment is accurate and convenient.

Figure 4:
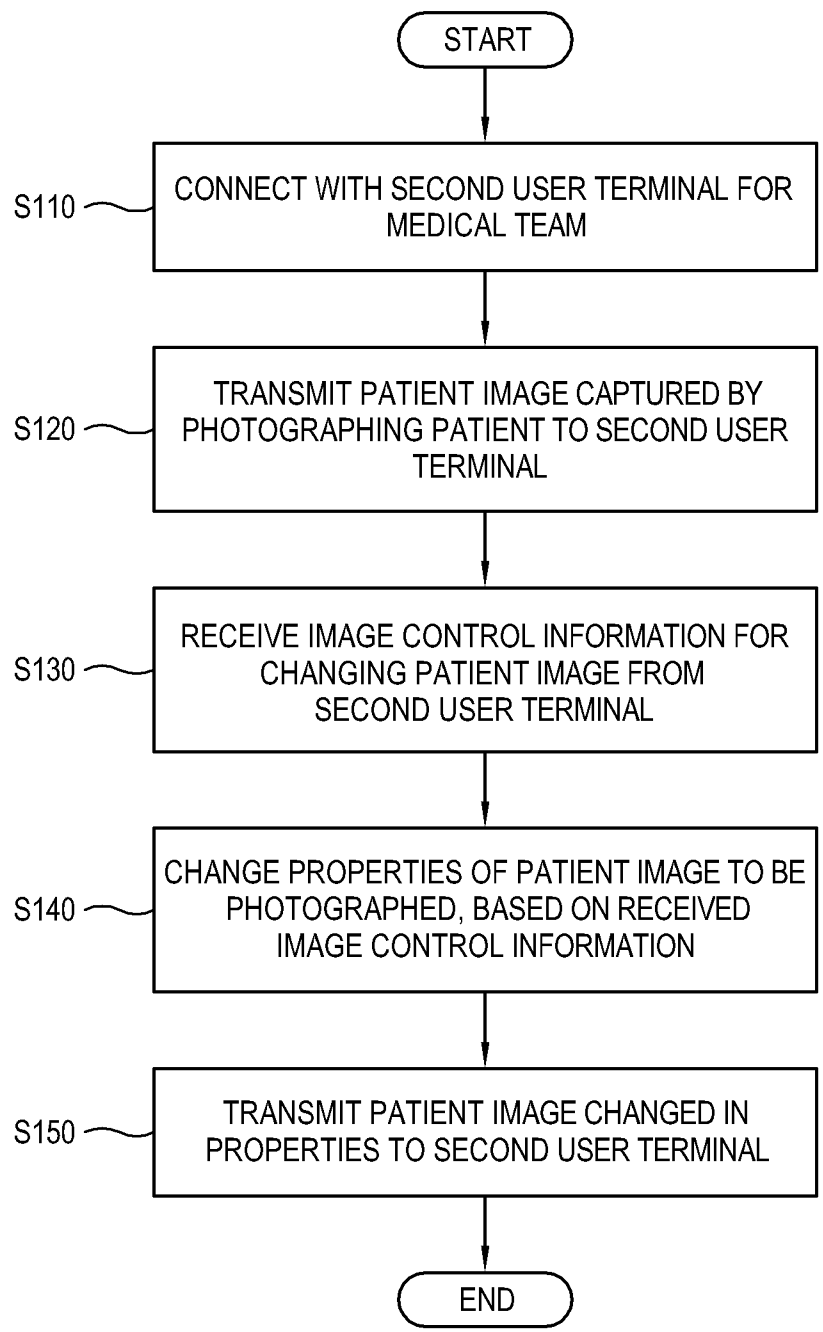
FIG. 4 is a flowchart of a user terminal according to an exemplary embodiment.

Below, a control method of a user terminal according to an exemplary embodiment will be described with reference to FIG. 4 and with regard to FIGS. 5 to 6 as necessary. FIG. 4 is a flowchart showing a control method of a user terminal according to an exemplary embodiment. As shown in FIG. 4, at operation S110, the user terminal connects with the second user terminal for the medical team. The operation S110 of connecting with the second user terminal may include an operation of connecting with the second user terminal via a server. Further, the operation S110 of connecting with the second user terminal may include an operation of connecting with the second user terminal via a display apparatus. Next, at operation S120, an initial patient image captured by photographing a patient is transmitted to the second user terminal. At this time, the patient image may be an image directly photographed by the camera or an image received from an external electronic device. Next, at operation S130, the image control information for changing the patient image is received from the second user terminal. At operation S140, the properties of a subsequent patient image of the diagnosis area to be photographed are changed based on the received image control information. At this time, the properties of the patient image may include at least one of the magnification, the resolution, the white balance, the exposure, the flash mode, the photographing mode, etc. of the patient image. Lastly, at operation S150, the patient image changed in properties is transmitted to the second user terminal.

According to an exemplary embodiment, the control method of the user terminal may further include displaying the patient image on the display. At this time, the patient image displayable on the display may be an image photographed by a camera mounted to the user terminal or an image received from the external electronic device such as a smart phone. Further, the patient image changed in properties based on the image control information received from the second user terminal of the medical team may also be displayed on the display.

For example, as shown in FIG. 5, for the telemedicine image service, a patient connects the user terminal 100, i.e., a TV with the second user terminal 200 of the medical team, i.e. a PC or TV. The patient conducts a video conversation with the medical team through the screen of the TV, and positions the camera of the smart phone paired with the TV to the diagnosis area such as the wounded area in response to the instructions of the medical team. The TV of the patient receives the patient image captured by photographing the diagnosis area from the smart phone and transmits the received image to the PC for the medical team. The medical team checks the patient image and transmits the image control information to the TV of the patient so that image of the diagnostic area can be optimized for the medical treatment, thereby changing the properties of the patient image or a subsequent patient image of the diagnostic area to be photographed by the smart phone.

For instance, if a patient image of the diagnostic area is not close up, the medical team may request, through the PC, that the patient image photographed by the smart phone be zoomed in. On the other hand, if a patient image is too close up, the patient image is controlled to be zoomed out. Further, if a patient image is not sharp, the medical team may request that the resolution of the photographed patient image be adjusted by transmitting the image control information to the user terminal through the PC of the medical team. In addition, if a patient image is influenced by artificial light or natural light, the medical team may control the white balance, the exposure, the flash, etc. of the patient image to be adjusted. Further, if the medical team desires to observe a pattern of change in a wounded area of a patient, a photographing mode for the patient image may be changed to take a moving image. Thus, a patient image changed in properties can be checked through the user terminal 100 of a patient, i.e. a TV and the second user terminal 200 of the medical team, i.e. a PC.

According to another exemplary embodiment, as shown in FIG. 6, a patient connects the user terminal 100, i.e. a smart phone with the second user terminal 200 of the medical team, i.e. a PC or a TV. The patient conducts a video conversation with the medical team through the screen of the smart phone, and positions the camera of the smart phone to the diagnosis area such as the wounded area in response to the instructions of the medical team. The patient sends the patient image corresponding to the diagnosis area photographed by the smart phone to the PC of the medical team, and the medical team checks the patient image and transmits the image control information to the smart phone of the patient so that the patient image can be optimized for the medical treatment, thereby changing the properties of the patient image to be photographed. Thus, a patient image changed in properties can be checked through the smart phone of a patient and the PC of a medical team.

According to still another exemplary embodiment, as shown in FIG. 7, a patient connects the user terminal 100, i.e., a TV with the second user terminal 200 of the medical team, i.e. a PC or TV via the server 300 offering a medical service. For the telemedicine image service, a patient acquires the patient image corresponding to the diagnosis area photographed by the electronic device 10, i.e. the smart phone, through the TV, and sends the patient image to the server 300. The patient image sent to the server 300 is transmitted to the second user terminal 200 of the medical team, and the patient receives the image control information about the patient image from the second user terminal 200 through the server 300. The TV of the patient controls the properties of the patient image photographed by the smart phone to be changed based on the image control information, and acquires and transmits the patient image changed in properties to the second user terminal 200 for the medical team via the server 300.

Accordingly, the user terminal 100 of a patient according to an exemplary embodiment controls the properties of the patient image to be changed while connecting with the second user terminal 200 for a medical team, so that the patient and the medical team can use the patient image optimized for the medical treatment, thereby accomplishing accurate and convenient medical treatment.

As described above, according to an exemplary embodiment, for a telemedicine image service, a patient image captured by photographing a patient is changed in properties based on image control information received from a terminal for a medical team, thereby providing accurate and convenient medical treatment.

Although a few exemplary embodiments have been shown and described, it will be appreciated by those skilled in the art that changes may be made in these exemplary embodiments without departing from the principles and spirit of the application, the scope of which is defined in the appended claims and their equivalents.

What is claimed is:

1. A user terminal comprising:

a communicator configured to communicate with a display apparatus;

an image acquirer configured to acquire a first patient image having first image properties captured by photographing a patient; and a controller configured to transmit the acquired first patient image to the display apparatus, receive image control information for changing the transmitted first patient image from the display apparatus, change the first patient image having the first image properties into a second patient image having second image properties based on the received image control information, and control the communicator to transmit the second patient image having the second image properties to the display apparatus.

2. The user terminal according to claim 1, wherein the first image properties and the second image properties comprise at least one of a magnification, a resolution, a white balance, an exposure, a flash mode and a photographing mode.

3. The user terminal according to claim 1, wherein the image acquirer comprises a camera configured to capture the patient image.

4. The user terminal according to claim 1, wherein the image acquirer receives the patient image from an external electronic device.

5. The user terminal according to claim 1, further comprising a display configured to display an image, wherein the controller controls the display to display the patient image.

6. The user terminal according to claim 1, wherein the communicator connects with the display apparatus via a server.

7. The user terminal according to claim 1, wherein the communicator connects with the display apparatus via a display apparatus.

8. A method of controlling a user terminal, the method comprising:

communicating with a display apparatus;

transmitting a first patient image having first image properties captured by photographing a patient to the display apparatus;

receiving image control information for changing the transmitted first patient image from the display apparatus;

changing the first patient image having the first image properties into a second patient image having second image properties based on the received image control information; and transmitting the second patient image having the second image properties to the display apparatus.

9. The method according to claim 8, wherein the first image properties and the second image properties comprise at least one of a magnification, a resolution, a white balance, an exposure, a flash mode and a photographing mode.

10. The method according to claim 8, wherein the patient image comprises an image photographed by a camera.

11. The method according to claim 8, wherein the patient image comprises an image received from an electronic device.

12. The method according to claim 8, further comprising displaying the patient image on a display.

13. The method according to claim 8, wherein the connecting the user terminal with the display apparatus comprises connecting the user terminal with the display apparatus via a server.

14. The method according to claim 8, wherein the connecting the user terminal with the display apparatus comprises connecting the user terminal with the display apparatus via a display apparatus.

15. A method of controlling a user terminal of a telemedicine service, the method comprising:

communicating with a display apparatus;

capturing a first image of a diagnostic area of a patient having first image properties with a camera;

transmitting the captured first image of the diagnostic area of the patient to the display apparatus;

receiving image control information for changing properties of the captured first image from the display apparatus;

capturing a second image of the diagnostic area of the patient having second image properties based on the received image control information, and transmitting the second image to the display apparatus.

16. The method of claim 15, wherein the first image properties and the second image properties comprise at least one of a magnification, a resolution, a white balance, an exposure, a flash mode and a photographing mode.

17. The method of claim 15, wherein the connecting the user terminal with the display apparatus comprises connecting the user terminal with the display apparatus via a server.

18. The method of claim 15, wherein the connecting the user terminal with the display apparatus comprises connecting the user terminal with the display apparatus via a display apparatus.

19. The method of claim 15, wherein the user terminal is at least one of a television, a personal computer, a smart phone, and a tablet computer.

20. The method of claim 15, wherein the second image is a higher definition image of the first image.

* * * * *